United States Patent
Asakawa et al.

(10) Patent No.: US 10,281,778 B2
(45) Date of Patent: May 7, 2019

(54) LIQUID CRYSTAL DISPLAY DEVICE

(71) Applicant: Japan Display Inc., Tokyo (JP)

(72) Inventors: Youichi Asakawa, Tokyo (JP); Shigesumi Araki, Tokyo (JP)

(73) Assignee: Japan Display Inc., Tokyo (JP)

( * ) Notice: Subject to any disclaimer, the term of this patent is extended or adjusted under 35 U.S.C. 154(b) by 18 days.

(21) Appl. No.: 15/455,752

(22) Filed: Mar. 10, 2017

(65) Prior Publication Data

US 2017/0184921 A1 Jun. 29, 2017

Related U.S. Application Data

(63) Continuation of application No. 14/596,456, filed on Jan. 14, 2015, now Pat. No. 9,709,862.

(30) Foreign Application Priority Data

Jan. 17, 2014 (JP) .................. 2014-006747

(51) Int. Cl.
*G02F 1/1337* (2006.01)
*G02F 1/1333* (2006.01)
(Continued)

(52) U.S. Cl.
CPC ...... *G02F 1/134363* (2013.01); *G02F 1/1368* (2013.01); *G02F 1/133345* (2013.01);
(Continued)

(58) Field of Classification Search
CPC ......... G02F 1/133707; G02F 1/134363; G02F 1/136227
See application file for complete search history.

(56) References Cited

U.S. PATENT DOCUMENTS

2002/0033922 A1 3/2002 Hidehira et al.
2009/0296037 A1* 12/2009 Tanaka .............. G02F 1/134363
349/143
(Continued)

FOREIGN PATENT DOCUMENTS

CN 101592813 B 7/2011
CN 102388337 A 3/2012
(Continued)

OTHER PUBLICATIONS

Office Action issued in Japanese Patent Application No. 2014-006747; dated Apr. 4, 2017; 7 pages, including English translation.
(Continued)

*Primary Examiner* — Nimeshkumar Patel
*Assistant Examiner* — Jacob R Stern
(74) *Attorney, Agent, or Firm* — Ulmer & Berne LLP

(57) ABSTRACT

A liquid crystal display device includes a liquid crystal between a TFT substrate including pixels formed in a matrix, and a counter substrate. A pixel electrode is formed in an area surrounded by scanning lines and video signal lines. A common electrode is formed in a lower layer of the pixel electrode through an interlayer insulating film. A long side of the pixel electrode of a first pixel is inclined at a first angle clockwise at a right angle to the extending direction of the scanning line. A long side of the pixel electrode of a second pixel is inclined at the first angle counterclockwise at a right angle to the extending direction of the scanning line. The liquid crystal is a negative type liquid crystal. Further, a protrusion formed in the long side of the pixel electrode has a side parallel to the extending direction of the scanning line.

20 Claims, 9 Drawing Sheets

(51) Int. Cl.
*G02F 1/1343* (2006.01)
*G02F 1/1362* (2006.01)
*G02F 1/1368* (2006.01)

(52) U.S. Cl.
CPC .. *G02F 1/133707* (2013.01); *G02F 1/136227* (2013.01); *G02F 2201/121* (2013.01); *G02F 2201/123* (2013.01)

(56) References Cited

U.S. PATENT DOCUMENTS

| | | |
|---|---|---|
| 2010/0207862 A1 | 8/2010 | Xu et al. |
| 2012/0281273 A1 | 11/2012 | Shinkai et al. |
| 2012/0327321 A1 | 12/2012 | Huang et al. |
| 2013/0127698 A1 | 5/2013 | Chang et al. |

FOREIGN PATENT DOCUMENTS

| | | |
|---|---|---|
| JP | 2000-56320 A | 2/2000 |
| JP | 2000-56336 A | 2/2000 |
| JP | 2010-8444 A | 1/2010 |
| JP | 2010-9004 A | 1/2010 |
| JP | 2011-100071 A | 5/2011 |
| JP | 2011102816 A | 5/2011 |
| WO | 2013168566 A1 | 11/2013 |

OTHER PUBLICATIONS

Office Action issued in Chinese Patent Application No. 201510020592.8; dated Apr. 25, 2017; 15 pages including partial English translation.

Office Action issued in Japanese Patent Application No. 2017-224225; dated Jul. 17, 2018; 4 pages, including English translation.

Office Action issued in Chinese Patent Application No. 201510020592.8; dated Jul. 16, 2018; 7 pages, including partial English translation.

* cited by examiner

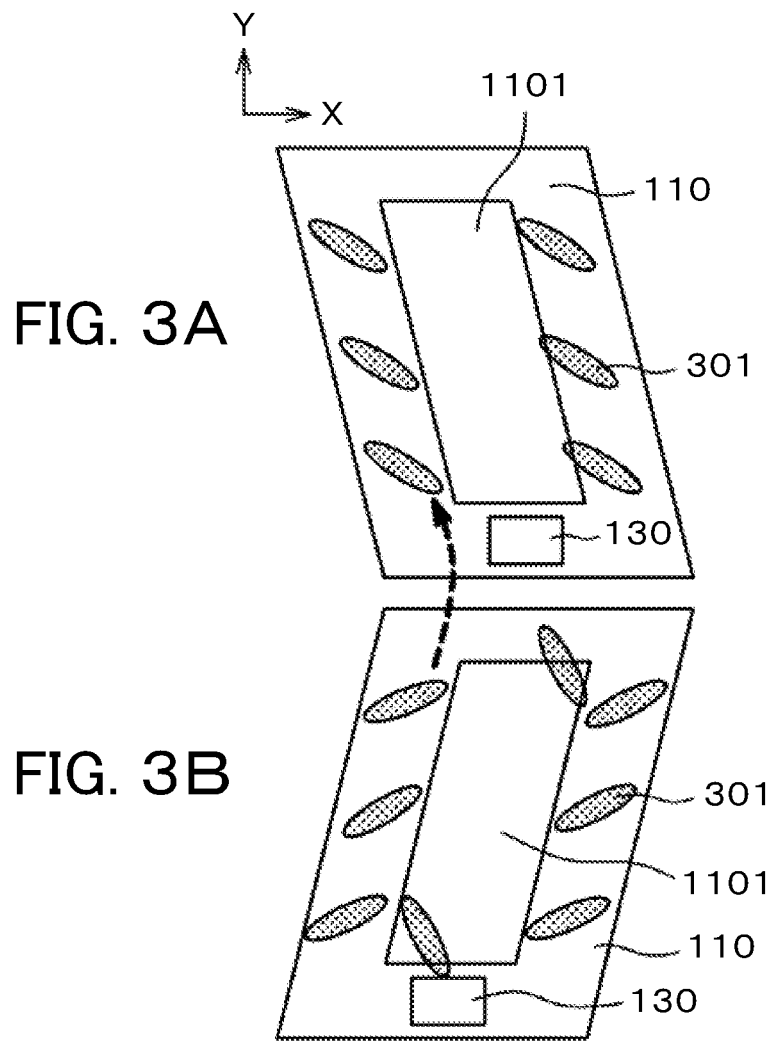

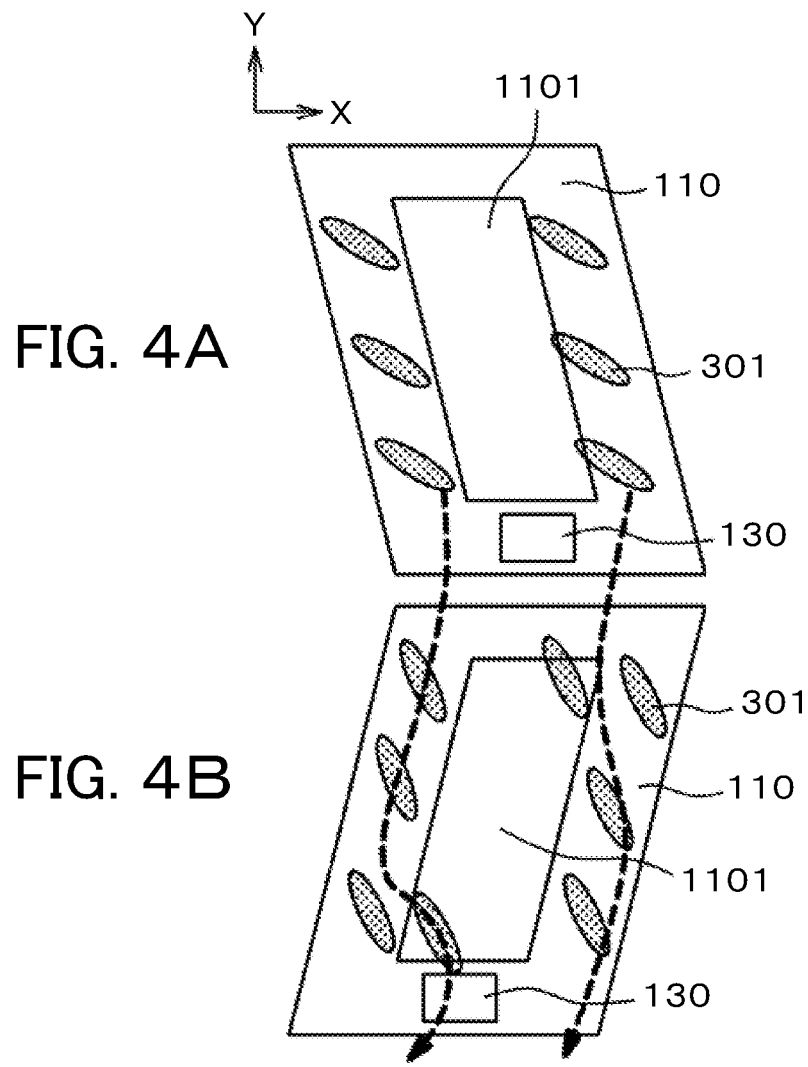

FIG. 8
FIG. 9
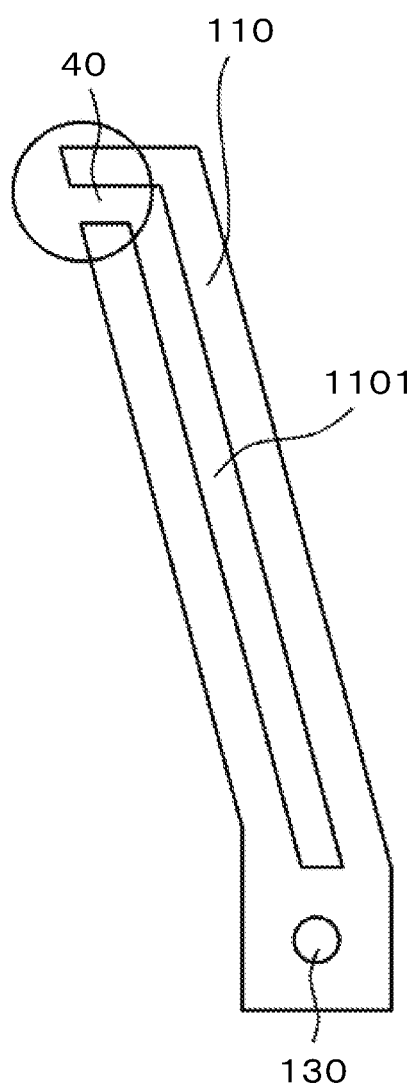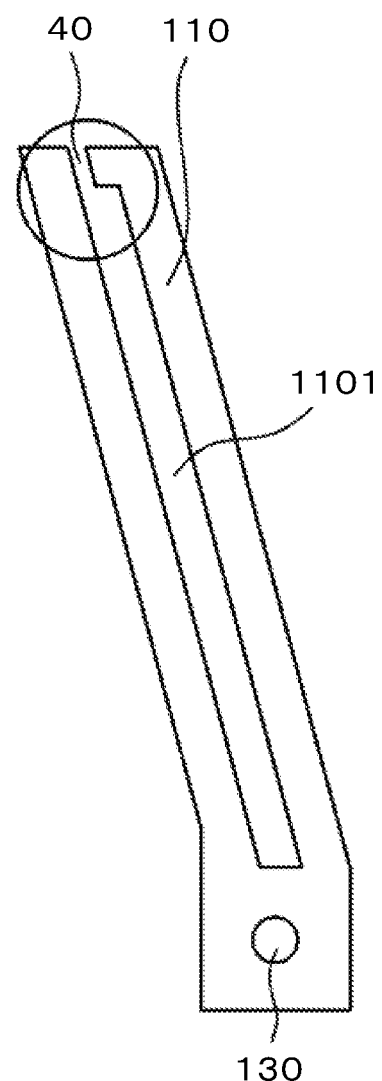

LIQUID CRYSTAL DISPLAY DEVICE

CLAIM OF PRIORITY

The present application is a continuation of U.S. patent application Ser. No. 14/596,456, filed on Jan. 14, 2015, which claims priority from Japanese Patent Application JP 2014-006747 filed on Jan. 17, 2014. The entire disclosures of each of these applications are incorporated herein by reference.

BACKGROUND

The present invention relates to a liquid crystal display device, and more particularly to an IPS mode liquid crystal display device with excellent viewing angle characteristics and designed to prevent the occurrence of reverse domain.

A display device includes a TFT substrate in which pixels each having a pixel electrode, a thin film transistor (TFT), and the like are arranged in a matrix form. Further, there is provided a counter substrate opposite the TFT substrate, in which color filters and the like are formed at positions corresponding to the pixel electrodes of the TFT substrate. Further, a liquid crystal is interposed between the TFT substrate and the counter substrate. Then, an image is formed by controlling the transmittance of light through each pixel by the liquid crystal molecules.

Liquid crystal display devices are flat and lightweight and thus are used in a variety of applications. Small liquid crystal display devices are widely used in mobile phones, digital still cameras (DSC), or other portable devices. The viewing angle characteristics are a problem in the liquid crystal display device. The viewing angle characteristics are a phenomenon that the brightness changes or the chromaticity changes between when the screen is viewed from the front, and when it is viewed in an oblique direction. The viewing angle characteristics are excellent in the In Plane Switching (IPS) mode for driving liquid crystal molecules by an electric field in the horizontal direction.

Although the IPS mode has excellent viewing angle characteristics, there is a case where the so-called azimuthal characteristics are not uniform, in which the viewing angle characteristics vary depending on the direction of viewing the screen. In order to address such a problem, Japanese Unexamined Patent Application Publication No. 2000-56336 describes a structure in which two domains with different rotational directions of liquid crystal molecules are formed in one pixel in order to reduce the azimuthal dependence of the viewing angle. This is sometimes called the dual domain method.

Further, when the surface of the liquid crystal display panel is pushed by a finger or other things, the distance between the counter substrate and the TFT substrate changes in this portion. As a result, a domain occurs due to the fact that the liquid crystal moves. This domain is a problem if it does not disappear quickly. Japanese Unexamined Patent Application Publication No. 2000-56320 describes a structure designed to prevent the occurrence of such a push domain.

SUMMARY

Among various types in the IPS mode, for example, there is a mode in which a common electrode is formed in a matted manner and a comb-shaped pixel electrode is provided on the common electrode with an insulating film interposed therebetween, to rotate liquid crystal molecules by the electric field generated between the pixel electrode and the common electrode. This type of mode can increase the transmittance and is currently mainstream.

The azimuthal dependence of the viewing angle is a problem also in such a liquid crystal display device. As the method of addressing the azimuthal dependence, for example, there is a method for forming first and second pixels with different rotational directions in order to reduce the viewing angle dependence through a combination of the first and second pixels, when a video signal is applied to the pixel electrode. This method is called the pseudo dual domain method.

Also in such a liquid crystal display panel, when the surface is pushed by a finger or other things, the distance between the counter substrate and the TFT substrate changes in this portion. As a result, a domain occurs due to the fact that the liquid crystal moves. When such a domain occurs, areas in which the rotational directions of liquid crystal molecules are different are formed in the same pixel. The boundary of these areas does not allow the light of the backlight to pass through, in which the so-called disclination occurs.

The disclination due to the occurrence of the push domain is unstable and is difficult to be controlled. It is not a huge problem if such a disclination disappears quickly. However, it could be a problem if it continues. When disclination occurs, the pixel transmittance is reduced, so that the pixel brightness is reduced. Further, the light from the backlight is scattered in the portion of the disclination. As a result, the contrast of the image is reduced.

In the present invention, it is desirable to prevent the disclination due to the occurrence of the push domain in the so-called pseudo dual domain method.

The present invention is to address the problem described above. The specific aspects are as follows.

(1) There is provided a liquid crystal display device including a liquid crystal interposed between a TFT substrate and a counter substrate. The TFT substrate includes pixels arranged in a matrix form. Each pixel has a pixel electrode formed in an area surrounded by scanning lines extending in a first direction and arranged in a second direction, and video signal lines extending in the second direction and arranged in the first direction. Further, a common electrode is formed in a lower layer of the pixel electrode through an interlayer insulating film. A long side of the pixel electrode of a first pixel is inclined at a first angle clockwise from the second direction. Further, a long side of the pixel electrode of a second pixel is inclined at the first angle counterclockwise from the second direction. The liquid crystal is a negative type liquid crystal. Then, a protrusion is formed at an end portion of the long side of the pixel electrode in the first direction.

(2) In the liquid crystal display device described in (1), the liquid crystal is a negative type liquid crystal, in which the protrusion in the first direction has a side parallel to the first direction.

(3) In the liquid crystal display device described in (1), the end of the protrusion overlaps the video signal line as seen in a plan view.

(4) There is provided a liquid crystal display device including a liquid crystal interposed between a TFT substrate and a counter substrate. The TFT substrate includes pixels arranged in a matrix form. Each pixel has a pixel electrode formed in an area surrounded by scanning lines extending in a first direction and arranged in a second direction, and video signal lines extending in the second direction and arranged in the first direction. Further, a common electrode is formed in a lower layer of the pixel electrode through an interlayer insulating film. A long side of the pixel electrode of a first pixel is inclined at a first angle clockwise from the second direction. Further, a long side of the pixel electrode of a second pixel is inclined at the first angle counterclockwise from the second direction. The pixel electrode is coupled to a source electrode of a TFT through a through hole. The pixel electrode has a slit. Then, a cutout is formed at an end portion of the slit of the pixel electrode on a side far from the through hole.

(5) There is provided a liquid crystal display device including a liquid crystal interposed between a TFT substrate and a counter substrate. The TFT substrate includes pixels arranged in a matrix form. Each pixel has a pixel electrode formed in an area surrounded by scanning lines extending in a first direction and arranged in a second direction, and video signal lines extending in the second direction and arranged in the first direction. Further, a common electrode is formed in a lower layer of the pixel electrode through an interlayer insulating film. A long side of the pixel electrode of a first pixel is inclined at a first angle clockwise from the second direction. Further, a long side of the pixel electrode of a second pixel is inclined at the first angle counterclockwise from the second direction. The pixel electrode is coupled to a source electrode of a TFT through a through hole. The pixel electrode has a slit. A cutout is formed at an end portion of the slit on a side far from the through hole of the pixel electrode. Then, a protrusion is formed in the first direction at an end portion of the long side of the pixel electrode.

According to the present invention, in an IPS mode liquid crystal display device, it is possible to prevent the occurrence of the push domain when input is performed by touch operation by pushing the counter substrate of the liquid crystal display panel by a finger or other things, in order to prevent the occurrence of unstable disclination. Thus, a stable image can be formed also in the input by touch operation.

BRIEF DESCRIPTION OF THE DRAWINGS

FIGS. 3A and 3B are plan views of pixels that show the alignment direction of liquid crystal molecules;

FIGS. 4A and 4B are plan views of the pixels that show the alignment direction of the liquid crystal molecules after the pushing force is released;

FIG. 8 is a plan view showing the structure of a pixel according to a second embodiment;

FIG. 9 is a plan view showing the structure of a pixel according to another aspect of the second embodiment.

DETAILED DESCRIPTION

The present invention will be described in detail below by means of preferred embodiments.

First Embodiment

Figure 1:
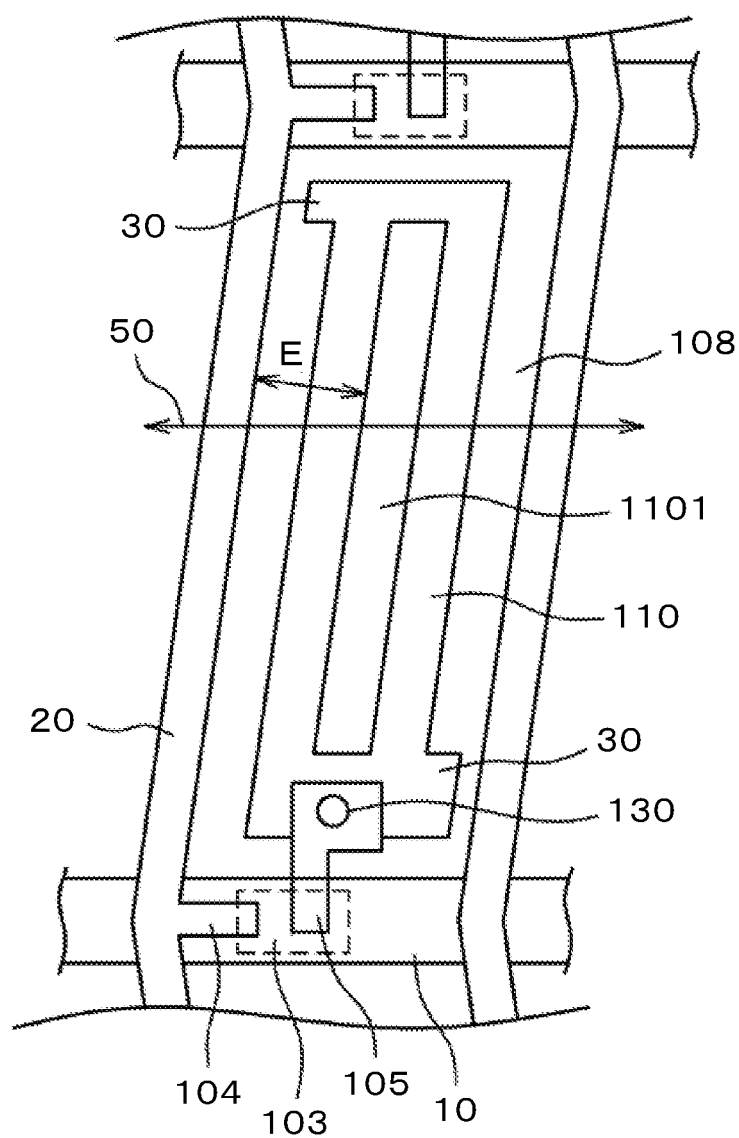
FIG. 1 is a plan view of a pixel of a liquid crystal display device according to the present invention.
Figure 2:
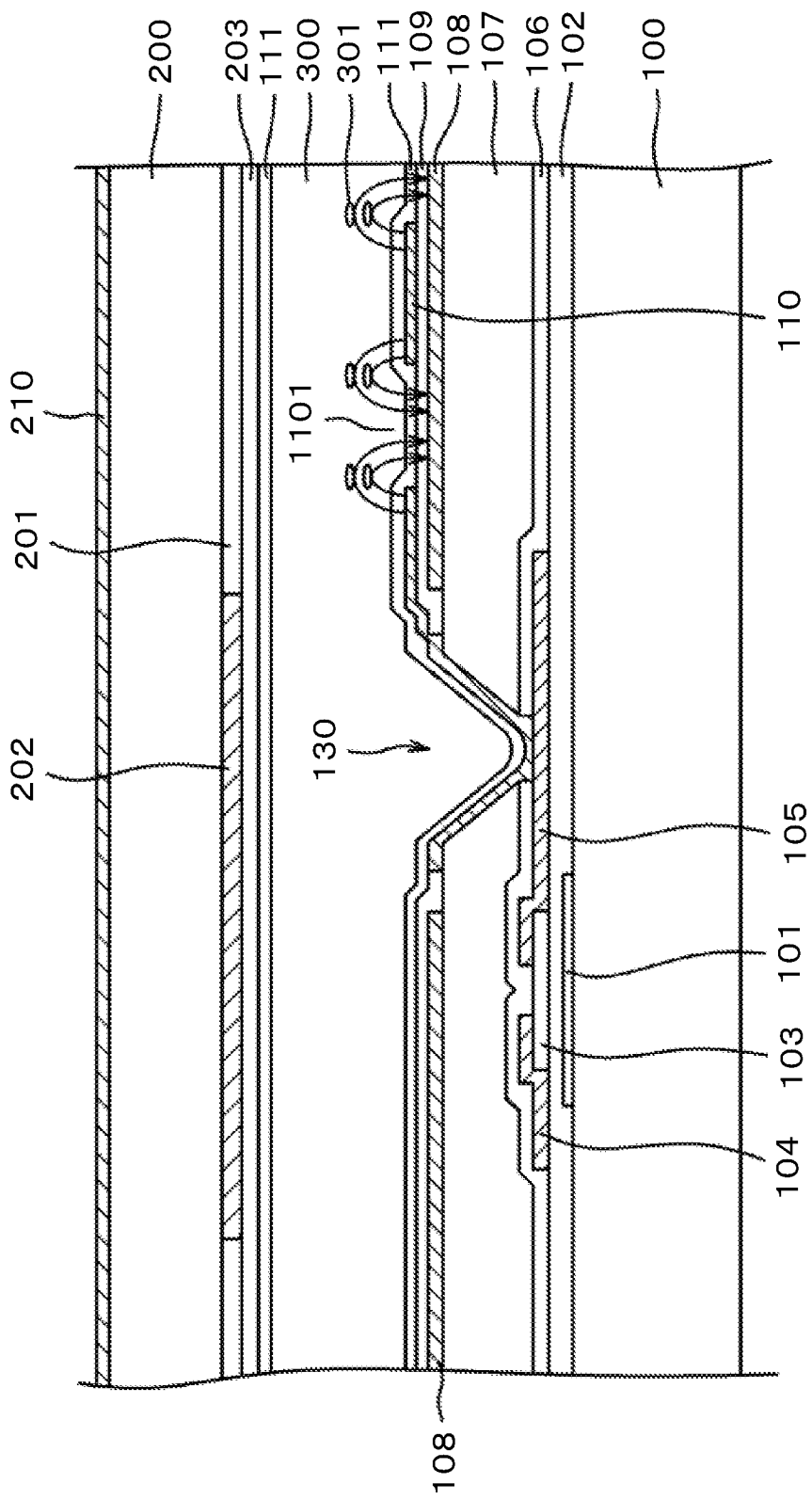
FIG. 2 is a cross-sectional view of the pixel shown in FIG. 1.

FIG. 1 is a plan view of a pixel structure according to the present invention and FIG. 2 is a cross-sectional view of a pixel portion. First, the cross-sectional structure of FIG. 2 will be described. In FIG. 2, a gate electrode 101 is formed on a TFT substrate 100 that is formed of glass. Then, a gate insulating film 102 is formed on the TFT substrate so as to cover the gate electrode 101. A semiconductor layer 103 is formed on the gate insulating film 102 above the gate electrode 101.

The semiconductor layer 103 is formed by a-Si. Further, n+a-Si is also formed in the semiconductor layer 103, which is electrically coupled to a drain electrode 104 and a source electrode 105. An inorganic passivation film 106 is formed so as to cover the semiconductor layer 103, the drain electrode 104, and the source electrode 105. Then, an organic passivation film 107 that also functions as a flattening film is formed on the inorganic passivation film 106. The organic passivation film 107 is formed thick with a thickness of 1 to 3 μm.

A common electrode 108 is formed in a planner shape by ITO on the organic passivation film 107. An interlayer insulating film 109 is formed so as to cover the common electrode 108. Then, a pixel electrode 110 with a through hole 110 is formed on the interlayer insulating film 109. The pixel electrode 110 is coupled to the source electrode 105 through a through hole 130. With respect to the source electrode 105 and the drain electrode 104, the names may be reversed as well. An alignment film 111 is formed so as to cover the pixel electrode 110 in order to initially align the liquid crystal molecules. When a video signal is applied to the pixel electrode 110, the electric lines of force are generated between the pixel electrode 110 and the common electrode 108 as shown in the figure. Then, each liquid crystal molecule 301 is rotated by the horizontal component of the electric lines of force to control the light from the backlight.

The counter substrate 200 is disposed opposite the TFT substrate 100 with a liquid crystal layer 300 interposed therebetween. Each color filter 201 is formed at a position corresponding to the pixel electrode 110 on the inside of the counter substrate 200. Then, a black matrix 202 is formed between the color filters 201. An overcoat film 203 is formed so as to cover the color filters 201 and the black matrix 202. Then, an alignment film 113 is formed on the overcoat film 203. The common electrode is not formed on the side of the counter substrate 200, so that an external conductive film 210 is formed by ITO on the outside of the counter substrate 200 in order to shield noise from the outside.

FIG. 2 is a case of a so-called bottom gate type TFT. However, there is also the case of a top gate type in which the gate electrode 102 is formed on the semiconductor layer 103. Further, the semiconductor layer 103 is not limited to a-Si and may be formed by poly-Si. It is also possible that the color filters are formed on the TFT substrate side.

There are two types of liquid crystal: a negative type liquid crystal and a positive type liquid crystal. The negative type liquid crystal has polar groups on the side of the short axis of the liquid crystal molecules while the positive type liquid crystal has polar groups on the side of the long axis of the liquid crystal molecules. Since the polar groups of the negative type liquid crystal are located on the side of the short axis of the liquid crystal molecules, the negative type liquid crystal has a molecular structure in which the dielectric anisotropy Δε is smaller than that of the positive type liquid crystal. Thus, the rotation of the liquid crystal molecules by the application of voltage is less likely to occur in the negative type liquid crystal than would be the case for the positive type liquid crystal. At the same time, it is difficult for the liquid crystal molecules in the negative type liquid crystal to rise up in the perpendicular direction to the substrate. Thus, the negative type liquid crystal is more resistant to the occurrence of push domain, and the like, than the positive type liquid crystal is. The following description assumes the case of the negative type liquid crystal. However, the present invention can also be applied to the case of the positive type liquid crystal.

FIG. 1 is a plan view showing a pixel structure according to the present invention. In FIG. 1, each scanning line 10 extends in the horizontal direction and is arranged in the vertical direction at a predetermined pitch. Further, each video signal line 20 extends in the vertical direction and is arranged in the horizontal direction at a predetermined pitch. Then, the TFT, the pixel electrode 110, and the common electrode 108 are present in the pixel.

In FIG. 1, the semiconductor layer 103 is formed on the scanning line 10 that also functions as the gate electrode, through the gate insulting film. The drain electrode 104 branching from the video signal line is formed on the semiconductor layer 103. The source electrode 105 is formed opposite the drain electrode 104 on the semiconductor layer 103. The region between the drain electrode 104 and the source electrode 105 is a TFT channel portion. The source electrode 105 is electrically coupled to the pixel electrode 110 through the through hole 130 to supply a video signal to the pixel electrode 110.

As described with reference to FIG. 2, the common electrode 108 is formed in a planar shape below the pixel electrode 110. When a single voltage is applied to the pixel electrode 110, as shown in FIG. 2, the electric lines of force pass through the liquid crystal layer 300 to reach the common electrode 108 through the slit 1101 of the pixel electrode 110 and through the outside of the pixel electrode 110. The liquid crystal is rotated by the horizontal component of the electric lines of force to control the transmittance of the liquid crystal layer.

In FIG. 1, an alignment axis 50 of the alignment film for the initial alignment of the liquid crystal molecules is equal to the extending direction of the scanning line 10. In this case, the initial alignment direction of the long axis of the liquid crystal molecules is equal to the alignment direction of the alignment film. In such a structure, when a voltage is applied to the pixel electrode 110, the direction of the electric field E with respect to the liquid crystal molecules is inclined at a predetermined angle with the alignment axis of the alignment film as shown in FIG. 1.

When an electric field is applied to the negative type liquid crystal, the long axis of the liquid crystal molecules rotates in the direction at right angle to the direction of the electric field. Thus, by taking the structure as shown in FIG. 1, the majority of the liquid crystal molecules rotate in the same direction, and thus it is possible to prevent the occurrence of disclination due to the occurrence of a different domain. However, as described below, the area in which the liquid crystal molecules rotate in the reverse direction occurs in a portion of the pixel electrode. In general, this area is small and the area of disclination that occurs due to this area is also small.

The long axis of the pixel electrode 110 shown in FIG. 1 is inclined at a predetermined angle θ of, for example, 5 to 15 degrees at a right angle to the alignment axis 50 of the alignment film, namely, to the y-axis direction. This is in order to rotate the majority of liquid crystal molecules in the same direction within the pixel when a voltage is applied to the pixel electrode 110 as described above. However, the fact that the rotational direction of the liquid crystal molecules is the same in the pixel means that the azimuthal dependence of the so-called viewing angle characteristics occurs in which the viewing angle characteristics vary depending on the direction of viewing the screen.

In order to address this problem, the pixel electrodes in the pixels provided upper and lower sides of the pixel shown in FIG. 1 are inclined to the direction at a right angle to the alignment axis of the pixel shown in FIG. 1. In other words, the pixel electrodes are inclined to the direction reverse to the pixel shown in FIG. 1 with respect to the y-axis direction. For this reason, when a voltage is applied to the pixel electrode, the rotation of the liquid crystal molecules is in the reverse direction compared to the case of the pixel shown in FIG. 1. In this way, it is possible to reduce the azimuthal dependence of the viewing angle characteristic, by arranging the pixels whose pixel electrodes are inclined to the opposite directions alternately in the y-axis direction in FIG. 1. Further, in order to increase the space factor, the video signal line 20 shown in FIG. 1 is formed in a zigzag shape in the y direction. However, also in this case, the present specification uses the phrase "the video signal line 20 extends in the y direction".

The pixel electrode 110 in FIG. 1 has a substantially parallelogram shape with the slit 1101 inside thereof. Further, the pixel electrode 110 has an outward protrusion 30 at the end portion thereof. The protrusion 30 is the feature in the first embodiment. The role of the protrusion 30 will be described below.

FIGS. 3A and 3B shows schematic plan views of the pixel arrangement showing the structure described above, in which FIG. 3A is a view of an upper pixel and FIG. 3B is a view of a lower pixel. In FIGS. 3A and 3B, the pixel electrode 110 of the upper pixel and the pixel electrode 110 of the lower pixel are inclined to the reverse direction with respect to the y-axis direction. Both the upper and lower pixels are coupled to the source electrode of the TFT through the through hole 130. Note that in FIGS. 3A to 4B, the shape of the through hole is rectangle.

In FIGS. 3A and 3B, a signal voltage is applied to the pixel electrode 110. Thus, the liquid crystal molecules 301, which are initially in the x direction, are rotated by the electric field in the vicinity of the pixel electrode 110. The directions of the electric field with respect to the liquid crystal molecules 301 are reversed across the x axis. As a result, the rotational direction of the liquid crystal molecules 301 in the upper pixel and the rotational direction of the liquid crystal molecules 301 in the lower pixel are also reversed across the x axis.

In the lower pixel in FIGS. 3A and 3B, the liquid crystal molecules 301 in corner portions of the slit 1101 formed inside the pixel electrode 110 are rotated in the reverse direction with respect to the liquid crystal molecules 301 in the other part of the slit 1101. This is referred to as reverse domain. In general, the area of the reverse domain is small. Here, when a portion of the counter substrate corresponding to the lower pixel is pushed, the distance between the TFT substrate and the counter substrate is reduced in this portion. Then, the liquid crystal molecules move to the upper pixel as shown in the arrow. The liquid crystal molecules 301 moving to the upper pixel are affected by the liquid crystal molecules 301 in the upper pixel and are arranged in the same direction as the direction of the liquid crystal molecules of the upper pixel.

Here, when the pushing force to the lower pixel is released, the liquid crystal molecules 301 flowing into the upper pixel return to the lower pixel. FIGS. 4A and 4B show the state of the alignment of the liquid crystal molecules 301 returned from the upper pixel to the lower pixel. FIG. 4A shows the upper pixel and FIG. 4B shows the lower pixel. In FIGS. 4A and 4B, the state of the liquid crystal molecules in the upper pixel is not changed, but the alignment state of the liquid crystal molecules 301 in the lower pixel to which the liquid crystal molecules 301 returned from the upper pixel is greatly different from the alignment state before the pushing force is applied.

In FIGS. 4A and 4B, the dashed arrows from the upper pixel to the lower pixel show the state in which the liquid crystal molecules return from the upper pixel to the lower pixel. Incidentally, when the liquid crystal molecules are rotated by the electric field, there are two stable directions. One is the state in which the polar groups of the liquid crystal molecules rotate in the same direction as the electric field. The other is the case where the polar groups of the liquid crystal molecules rotate in the reverse direction to the electric field. The state in which polar groups of the liquid crystal molecules rotate in the same direction as the electric field is referred to as stable direction. Further, the case where the polar groups of the liquid crystal molecules rotate in the reverse direction to the electric field is referred to as metastable state.

The liquid crystal molecules 301 returned from the upper pixel are aligned again in the lower pixel. However, at this time, the alignment direction of the liquid crystal molecules 301 flowing into the lower pixel is affected by the upper pixel. In the lower pixel, the alignment direction of the liquid crystal molecules of this state is at an angle closer to the stable state than to the metastable state. As a result, the liquid crystal molecules 301 returned from the upper pixel have alignment with the direction of the liquid crystal molecules 301 that is different from the initial stable state. The domain formed in this state is referred to as reverse domain.

Accordingly, the area of the reverse domain in the lower pixel after the liquid crystal molecules 301 retuned from the upper pixel is much greater than the area of the reverse domain in the initial upper pixel. Thus, the area of the disclination occurred is also increased. This is the problem of the push domain.

Figure 5A:
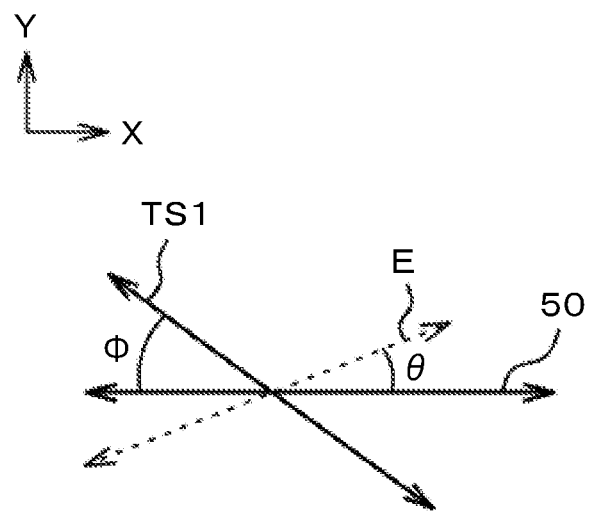
FIGS. 5A and 5B are views showing the alignment axis of the alignment film, the direction of the electric field, the stable alignment direction of the liquid crystal molecules, and the metastable direction of the liquid crystal molecules in the pixel.
Figure 5B:
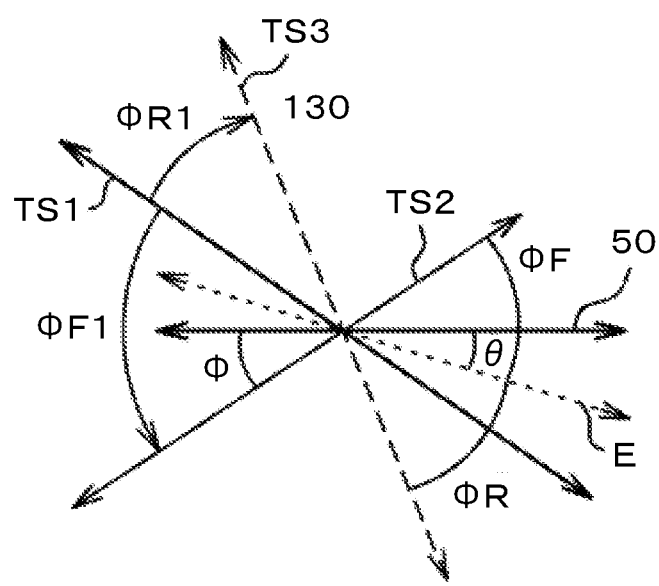

FIGS. 5A and 5B are views for explaining the contents described above by means of the relationship of the alignment axis 50 of the alignment film, the direction E of the electric field, the alignment direction of the liquid crystal molecules by the electric field, and the like. FIG. 5A shows the relationship of the alignment axis 50 of the alignment film in the upper pixel in FIGS. 3A and 3B or FIGS. 4A and 4B, namely, the initial alignment direction, the direction E of the electric field, and the alignment direction TS1 of the liquid crystal molecules by the electric field. In FIG. 5A, the direction of the alignment axis 50 of the alignment film is the direction of the x axis, and the direction E of the electric field is inclined at a bias angle θ from the x axis. The liquid crystal molecules 301 are of the negative type liquid crystal, so that the long axis of the liquid crystal molecules 301 rotates in the direction at a right angle to the electric field E. Thus, the liquid crystal molecules 301 are aligned in the direction of TS1. The rotation angle of this case is indicated by a twist angle φ.

FIG. 5B is a view showing the alignment direction TS3 of the liquid crystal molecules due to the metastable direction, the alignment direction TS1 of the liquid crystal molecules immediately after the liquid crystal molecules returned from the upper pixel, and the like, in addition to the alignment axis 50 of the alignment film, the direction E of the electric field, and the alignment direction TS2 of the liquid crystal molecules by the electric filed in the lower pixel shown in FIGS. 3A and 3B or FIGS. 4A and 4B. In FIG. 5B, the fact that the direction 50 of the alignment axis of the alignment film is the x direction is the same as in FIG. 5A. However, the direction E of the electric field in FIG. 5B is reverse to the direction E of the electric field in FIG. 5A across the x-axis direction.

Thus, the rotational direction of the liquid crystal molecules 301 before a pushing force is applied to FIG. 5B is reversed across the axis direction as compared to the case of FIG. 5A. In other words, the direction of the liquid crystal molecules 301 in FIG. 5B is the direction in which the liquid crystal molecules are aligned in the lower pixel in FIG. 3B. As can be seen from the comparison of FIGS. 3A and 3B, the directions of the alignment of the liquid crystal molecules 301 in the upper pixel and in the lower pixel are symmetrical across the x-axis direction.

In other words, in the case of the positive type liquid crystal, the liquid crystal molecules 301 rotate to the direction in which the bias angle θ, which is the angle between the alignment direction 50 of the alignment film and the direction E of the electric field, is small. On the other hand, in the case of the negative type liquid crystal, there is a tendency in which the direction at a right angle to the long axis of the liquid crystal molecules aligns to the direction of the electric filed. Thus, the liquid crystal molecules 301 rotate in the direction in which the bias angle is large. However, the energy of the liquid crystal molecules 301 is reduced also in the metastable direction TS3 in FIG. 5B. For this reason, the liquid crystal molecules 301 can also be aligned in the direction of the metastable direction TS3 if there is a trigger for it. Here, as shown in FIG. 5B, the absolute value of the angle φF between the electric field direction E and the stable direction TS2 of the liquid crystal molecules and the absolute value of the angle φR between the electric field direction E and the metastable direction TS3 of the liquid crystal molecules are the same, although their directions are different.

As shown in FIGS. 3A and 3B, the liquid crystal molecules 301 flowing into the upper pixel from the lower pixel are affected by the liquid crystal molecules 301 in the upper pixel, and are aligned in the same direction as the direction of the liquid crystal molecules 301 in the upper pixel. Then, the liquid crystal molecules 301 return from the upper pixel to the lower pixel. At this time, the liquid crystal molecules 301 initially maintain the alignment state in the upper pixel. This state is TS1 in FIG. 5B.

After that, the liquid crystal molecules 301 flowing into the lower pixel are aligned again from the alignment direction TS1. At this time, the angle φR1 between the alignment direction TS1 of the returned liquid crystal molecules 301 and the alignment direction TS3, which is the metastable direction, is smaller than the angle φF1 between the alignment direction TS1 of the returned liquid crystal molecules 301 and the alignment direction TS2 which is the stable direction. As a result, the returned liquid crystal molecules 301 are aligned in the metastable direction TS3. On the other hand, the liquid crystal molecules, which are originally present in the lower pixel and did not flow into the upper pixel, remain in the original alignment direction TS2.

Thus, there are two areas with different alignment directions of the liquid crystal molecules 301 in the lower pixel due to the fact that the pushing force is released and the liquid crystal molecules return to the lower pixel. As a result, disclination occurs over a wide range. This has been a huge problem in the past. Note that all the liquid crystal molecules 301 are aligned in the metastable direction (reverse direction) in FIG. 4B to make it easy to understand. However, actually the liquid crystal molecules 301 in a certain area maintain the alignment direction before the push, so that two domains are present.

Note that the alignment direction of the liquid crystal molecules 301 propagates to the adjacent liquid crystal molecules 301. Thus, if any of the liquid crystal molecules 301 are aligned in a specific direction, this alignment propagates and the liquid crystal molecules 301 with the same alignment are distributed in a wide range to form a domain.

As described above, the liquid crystal molecules 301 can be twisted in the stable direction if the liquid crystal molecules 301 returned from the upper pixel in FIGS. 4A and 4B can be forcibly aligned, for example, in the x direction which is the alignment axis direction 50 of the alignment film, instead of the direction of the alignment of the liquid crystal molecules 301 in the upper pixel. As a result, it is possible to avoid the phenomenon in which the area of the revers domain widely occurs.

The protrusion in FIG. 1 is to fix the liquid crystal molecules 301 to the alignment axis direction 50 of the alignment film in the protrusion 30, so that the direction of the alignment of the liquid crystal molecules 301 returned from the upper pixel can be forcibly direct to the direction 50 of the alignment axis of the alignment film by the influence of the liquid crystal molecules 301 located in the protrusion 30. Note that the protrusion 30 is formed not only in the upper end portion but also in the lower end portion in the pixel electrode 110 shown in FIG. 1. However, the liquid crystal may return from the lower pixel, so that the lower protrusion of the pixel electrode 110 is to act with respect to such liquid crystal molecules.

Figure 6:
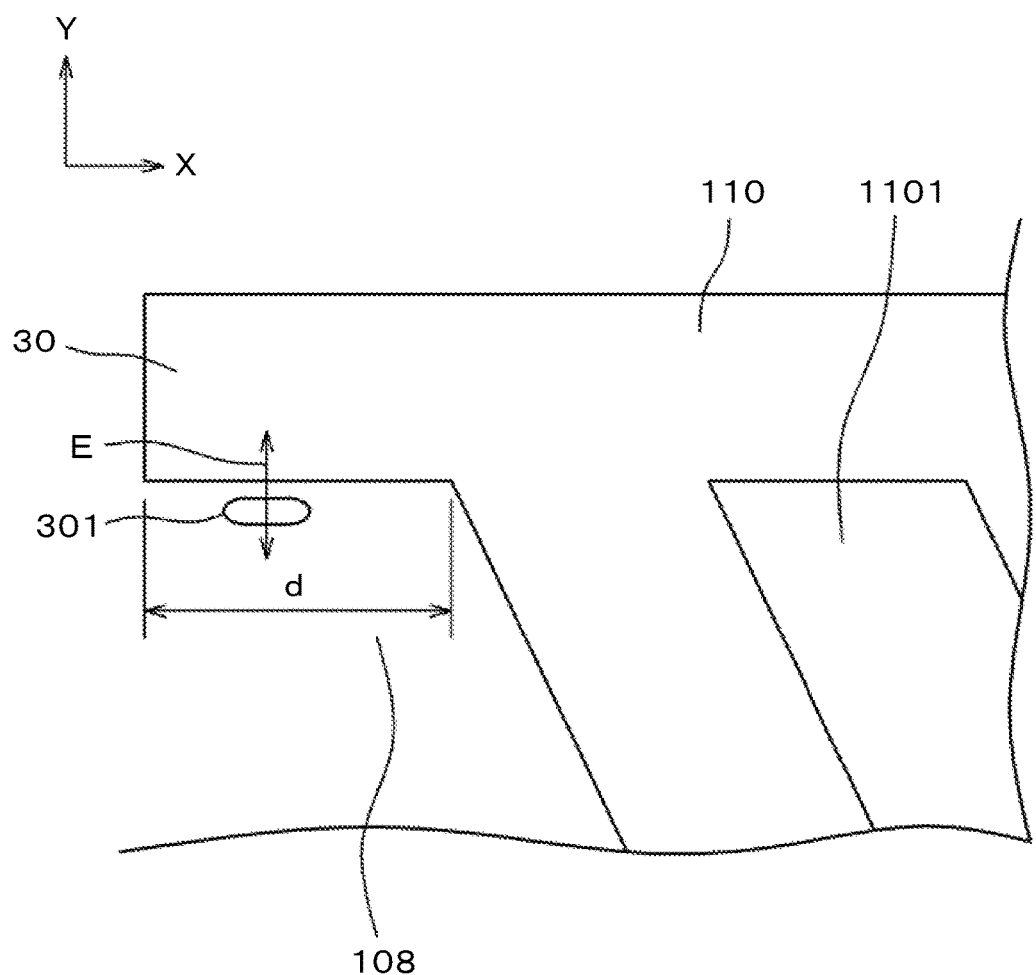
FIG. 6 is a plan view showing the details of the pixel electrode in the vicinity of a protrusion.

FIG. 6 is a detailed plan view showing the action of the protrusion 30 in FIG. 1. In FIG. 6, the electric field E is generated between the pixel electrode 110 and the lower common electrode 108. This electric field E is the y direction as seen in a plan view. The initial alignment of the liquid crystal molecules 301 is the x direction which is the alignment direction 50 of the alignment film. Since the liquid crystal molecules 301 are of the negative type liquid crystal, the liquid crystal molecules 301 do not rotate even if the electric field is applied. In other words, the long axis direction of the liquid crystal molecules 301 is strongly fixed to the x-axis direction.

In this case, the liquid crystal molecules 301 returned from the upper pixel are aligned in the x-axis direction by the influence of the liquid crystal molecules 301 in the protrusion 30. As a result, the liquid crystal molecules 301 are aligned in the stable direction, so that it is possible to prevent the liquid crystal molecules 301 from being aligned in the metastable direction to form the reverse domain. This is the same for the action of the lower protrusion 30 shown in FIG. 1. Note that in order to have this action available, it is necessary that the protrusion 30 has a side parallel to the x-axis direction.

Figure 7:
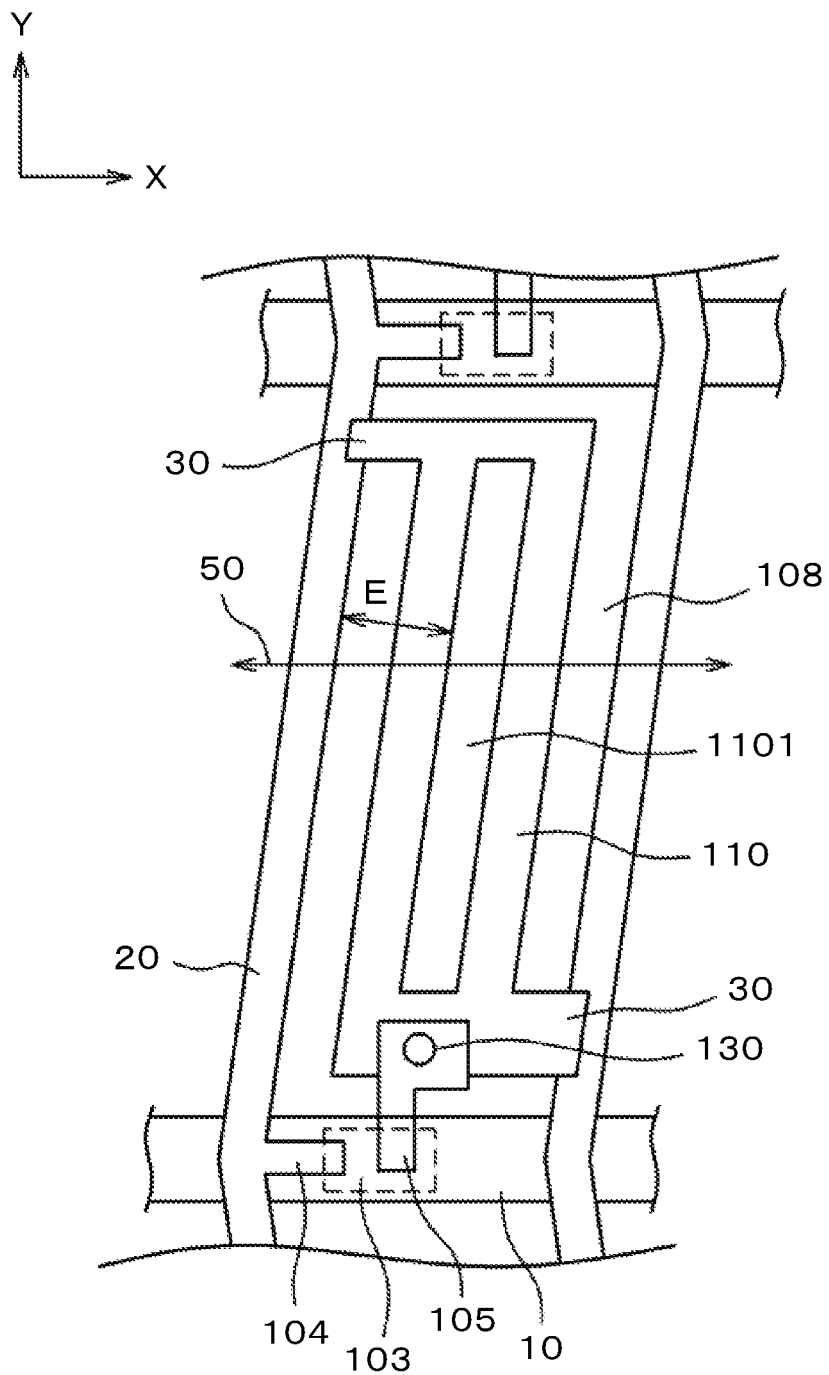
FIG. 7 is a plan view of a pixel according to a first embodiment when the protrusion extends to above the video signal line.

As described above, the longer the length d of the protrusion 30 of the pixel electrode 110, the greater the action of the protrusion 30. FIG. 7 is an example in which the protrusion 30 is extended above the video signal line 20 by increasing the length of the protrusion 30. Even with this structure, the common electrode 108 is present between the pixel electrode 110 and the video signal line 20, so that the unwanted signal from the video signal line 20 does not affect the pixel electrode 110. The other structures of FIG. 7 are the same as those of FIG. 1.

As described above, according to the present embodiment, it is possible to prevent the occurrence of disclination caused by the returned liquid crystal molecules 301 that are aligned in the reverse direction to form a reverse domain, by forming a protrusion in the pixel electrode 110.

Second Embodiment

Another reason why the liquid crystal molecules 301 returned from the upper pixel are inversely aligned in FIG. 4B is that the returned liquid crystal molecules 301 are affected by the alignment of the liquid crystal molecules 301 in the revers domain originally present in the lower pixel. In other words, the liquid crystal molecules 301 have an influence on the adjacent liquid crystal molecules 301 about the alignment direction.

From this meaning, in the present embodiment, it is desirable to reduce the area of the reverse domain present in the pixel as much as possible, and if possible, to eliminate the particular area. FIG. 8 shows a structure in which when a reverse domain has been formed in the left upper end portion of the slit 1101 of the pixel electrode 110, a cutout is formed in this portion of the pixel electrode 110 in order to prevent the reverse domain from being formed. In this case, the cutout is formed at the end portion of the slit on the long side of the pixel electrode 110 at the end far from the through hole 130.

FIG. 9 is another aspect of the present embodiment. In this case also, a reverse domain has been formed in the left end portion of the slit 1101 of the pixel electrode 110. Also in FIG. 9, a cutout is formed at the end portion of the pixel electrode 110 in this portion. In this case, however, the cutout is formed at the end portion of the slit on the short side of the pixel electrode 110 at the end far from the through hole 130.

Figure 10:
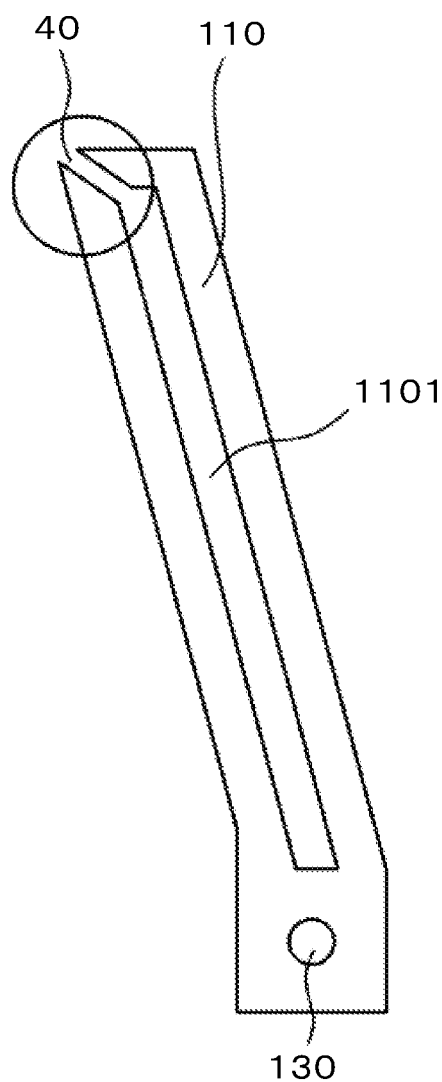
FIG. 10 is a plan view showing the structure of a pixel according to still another aspect of the second embodiment.

FIG. 10 is still another aspect of the present embodiment. In this case also, a reverse domain has been formed in the left upper end portion of the slit 1101 of the pixel electrode 110. Also in FIG. 10, a cutout is formed at the end portion of the pixel electrode in the left upper end portion of the slit 1101. In this case, however, the cutout is formed at the end portion of the slit on the short and long sides of the pixel electrode 110 at the end far from the through hole 130.

FIGS. 8 to 10 are for the case where the reverse domain has been formed in the left upper end portion of the slit 1101 of the pixel electrode 110. However, also in the case where the reverse domain has been formed in the right upper end portion of the slit 1101 of the pixel electrode 110, it is possible to form a cutout similarly as described above. In conclusion, in the pixel electrode 110 with the slit 1101, it is possible to form a cutout in the pixel electrode 110 to prevent the occurrence of the reverse domain at the end portion of the slit 1101 on the side far from the through hole 130 for coupling the pixel electrode 110 and the source electrode of the TFT.

It should be noted that the occurrence of the push domain can be prevented more effectively through a combination of the first and second embodiments.

What is claimed is:

1. A liquid crystal display device comprising a liquid crystal interposed between a TFT substrate and a counter substrate,
wherein the TFT substrate includes pixels, each pixel having a pixel electrode formed in an area surrounded by scanning lines extending in a first direction and arranged in a second direction, and video signal lines arranged in the first direction,
wherein a common electrode is formed in a lower layer of the pixel electrode,
wherein an interlayer insulating film having a through hole is located between the common electrode and the pixel electrode,
wherein the pixel electrode of a first pixel is inclined at a first angle clockwise from the second direction, has a first linear line extending along a long side of the first pixel, a third line connecting to one end of the first linear line, and a fourth line connecting to the other end of the first linear line,
wherein the pixel electrode of a second pixel is inclined at a second angle counterclockwise from the second direction, and has a second linear line extending along a long side of the second pixel,
wherein the first linear line and the second linear line don't have a bending portion at centers of the first pixel and the second pixel,
wherein the pixel electrode of the first pixel has a single opening,
wherein a first scanning line exists between the first pixel and the second pixel in a plan view,
wherein the third line or the fourth line has a first protrusion extending in the first direction and overlapping with one of the video signal lines as seen in a plan view, and
wherein the fourth line overlaps with the through hole.

2. The liquid crystal display device according to claim 1, wherein the liquid crystal is a negative type liquid crystal.

3. The liquid crystal display device according to claim 1, wherein an end of the first protrusion overlaps the video signal line as seen in a plan view.

4. The liquid crystal display device according to claim 1, wherein an angle formed by an extending direction of the first linear line and an extending direction of the first protrusion is an acute angle.

5. The liquid crystal display device according to claim 1, wherein the third line has the first protrusion and the fourth line has a second protrusion, and
wherein the second protrusion extends in an opposite direction to the first protrusion.

6. The liquid crystal display device according to claim 1, wherein the first pixel electrode has a fifth linear line extending along the long side of the first pixel,
wherein the first linear line and the fifth linear line are first long sides of the first pixel electrode, and
wherein the single opening is formed surrounded by the first linear line, the fifth linear line, the third line, and the fourth line.

7. The liquid crystal display device according to claim 1, wherein
a third protrusion extending in a first direction connects with one end of the second linear line,
the third protrusion is located nearer to the first scanning line than the second linear line, and
an angle formed by an extending direction of the second linear line and an extending direction of the third protrusion is an acute angle.

8. The liquid crystal display device according to claim 7, wherein
a fourth protrusion connects with the other end of the fourth line,
the fourth protrusion is located farther from the first scanning line than the third protrusion, and
the fourth protrusion extends in an opposite direction to the third protrusion.

9. The liquid crystal display device according to claim 1, wherein the first direction is an initial alignment direction of a liquid crystal molecule.

10. The liquid crystal display device according to claim 1, wherein the first angle is substantially the same as the second angle.

11. A liquid crystal display device comprising a liquid crystal interposed between a TFT substrate and a counter substrate,
wherein the TFT substrate includes pixels, each pixel having a pixel electrode formed in an area surrounded by scanning lines extending in a first direction and arranged in a second direction, and video signal lines arranged in the first direction,
wherein a common electrode is formed in a lower layer of the pixel electrode,
wherein the pixel electrode of a first pixel is inclined at a first angle clockwise from the second direction, has a first linear line extending along a long side of the first pixel, a third line connecting to the first linear line, and a fourth line connecting to the first linear line,
wherein the pixel electrode of a second pixel is inclined at a second angle counterclockwise from the second direction, and has a second linear line extending along a long side of the second pixel,
wherein a first scanning line exists between the first pixel and the second pixel in a plan view,
wherein the third line or the fourth line has a first protrusion extending in the first direction,
wherein the first linear line and the second linear line don't have a bending portion at centers of the first pixel and the second pixel,
wherein the pixel electrode of the first pixel has a single opening,
wherein the first protrusion overlaps with one of the video signal lines, and
an angle formed by an extending direction of the first linear line and an extending direction of the first protrusion is an acute angle.

12. The liquid crystal display device according to claim 11, wherein the liquid crystal is a negative type liquid crystal.

13. The liquid crystal display device according to claim 11, wherein an end of the first protrusion overlaps the video signal line as seen in a plan view.

14. The liquid crystal display device according to claim 11, wherein
an interlayer insulating film having a through hole is located between the common electrode and the pixel electrode, and
the fourth line overlaps with the through hole.

15. The liquid crystal display device according to claim 11, wherein
the third line connects to one end of the first linear line and the fourth line connects to the other end of the first linear line.

16. The liquid crystal display device according to claim 11, wherein the first pixel electrode has a fifth linear line extending along the long side of the first pixel, wherein the first linear line and the fifth linear line are first long sides of the first pixel electrode, and wherein the single opening is formed surrounded by the first linear line, the fifth linear line, the third line, and the fourth line.

17. The liquid crystal display device according to claim 11, wherein a third protrusion extending in a first direction connects with one end of the second linear line, the third protrusion is located nearer to the first scanning line than the second linear line, and an angle formed by an extending direction of the second linear line and an extending direction of the third protrusion is an acute angle.

18. The liquid crystal display device according to claim 17, wherein a fourth protrusion connects with the other end of the fourth line, the fourth protrusion is located farther from the first scanning line than the third protrusion, and the fourth protrusion extends in an opposite direction to the third protrusion.

19. The liquid crystal display device according to claim 11, wherein the first direction is an initial alignment direction of a liquid crystal molecule.

20. The liquid crystal display device according to claim 11, wherein the first angle is substantially the same as the second angle.

* * * * *